(12) United States Patent
Winget et al.

(10) Patent No.: US 7,101,505 B2
(45) Date of Patent: Sep. 5, 2006

(54) METHOD OF MANUFACTURING AN IN-MOLD LAMINATE COMPOSITION

(75) Inventors: Larry J. Winget, Leonard, MI (US); Darius J. Preisler, Macomb, MI (US); Jason T. Murar, Clinton Township, MI (US)

(73) Assignee: Cadence Innovation LLC, Troy, MI (US)

( * ) Notice: Subject to any disclaimer, the term of this patent is extended or adjusted under 35 U.S.C. 154(b) by 0 days.

(21) Appl. No.: 11/226,010

(22) Filed: Sep. 14, 2005

(65) Prior Publication Data

US 2006/0006588 A1   Jan. 12, 2006

Related U.S. Application Data

(63) Continuation of application No. 10/193,407, filed on Jul. 11, 2002, now abandoned, and a continuation of application No. 09/083,943, filed on May 22, 1998, now Pat. No. 6,428,738, and a continuation-in-part of application No. 08/929,025, filed on Sep. 15, 1997, now abandoned, and a continuation of application No. 08/551,517, filed on Nov. 1, 1995, now abandoned.

(51) Int. Cl.
*B29C 51/10* (2006.01)
*B29C 45/14* (2006.01)

(52) U.S. Cl. ............... 264/513; 264/553; 264/267; 264/275; 264/250

(58) Field of Classification Search ............. 264/513, 264/553, 267, 275, 250
See application file for complete search history.

(56) References Cited

U.S. PATENT DOCUMENTS

| 2,313,985 | A | | 3/1943 | Bradshaw |
|---|---|---|---|---|
| 3,122,598 | A | | 2/1964 | Berger |
| 3,740,918 | A | | 6/1973 | Meyer |
| 3,934,385 | A | | 1/1976 | Paulus et al. |
| 4,076,790 | A | | 2/1978 | Lind |
| 4,205,036 | A | | 5/1980 | Trame |
| 4,414,731 | A | | 11/1983 | Riemer |
| 4,431,711 | A | | 2/1984 | Eisfeller |
| 4,485,065 | A | | 11/1984 | Hatakeyama et al. |
| 4,562,032 | A | | 12/1985 | Gaudreau |
| 4,587,160 | A | | 5/1986 | Williams et al. |
| 4,634,565 | A | | 1/1987 | Irrgang |
| 4,734,230 | A | * | 3/1988 | Rhodes et al. ............. 264/46.4 |
| 4,769,100 | A | | 9/1988 | Short et al. |
| 4,810,749 | A | | 3/1989 | Pinchuk |
| 4,878,827 | A | | 11/1989 | Muller |
| 4,902,557 | A | | 2/1990 | Rohrbacher |
| 4,927,675 | A | | 5/1990 | Adams et al. |
| 4,933,237 | A | | 6/1990 | Krenceski et al. |
| 4,952,351 | A | | 8/1990 | Parker et al. |

(Continued)

FOREIGN PATENT DOCUMENTS

JP   57-163521   10/1982

(Continued)

*Primary Examiner*—Edmund H. Lee
(74) *Attorney, Agent, or Firm*—Brooks Kushman P.C.

(57) ABSTRACT

A method is provided for manufacturing a painted plastic component such as painted air bag covers, side cladding or exterior bumpers, which includes a painted film sheet and a one-piece thermoplastic elastomeric structural carrier. A bottom contact surface of the film sheet bonds with a front contact surface of the structural carrier by diffusion between the contact surfaces thereof within a mold cavity of an injection mold separate from the mold cavity of a vacuum mold which is utilized to vacuum-mold the film sheet to form the desired painted plastic component.

1 Claim, 2 Drawing Sheets

U.S. PATENT DOCUMENTS

| | | |
|---|---|---|
| 4,959,189 A | 9/1990 | Rohrbacher et al. |
| 4,985,194 A | 1/1991 | Watanabe |
| 4,999,227 A | 3/1991 | Vander Togt |
| 5,019,199 A | 5/1991 | Menke et al. |
| 5,043,114 A | 8/1991 | Saito et al. |
| 5,106,679 A | 4/1992 | Wataya et al. |
| 5,149,479 A | 9/1992 | Nakajima |
| 5,178,708 A | 1/1993 | Hara et al. |
| 5,183,615 A | 2/1993 | Zushi |
| 5,217,563 A | 6/1993 | Niebling et al. |
| 5,256,354 A | 10/1993 | Chadwick |
| 5,261,984 A | 11/1993 | Minnick et al. |
| 5,286,528 A | 2/1994 | Reafler |
| 5,304,273 A | 4/1994 | Kenrick et al. |
| 5,316,822 A | 5/1994 | Nishijima et al. |
| 5,334,340 A | 8/1994 | Zushi |
| 5,342,666 A | 8/1994 | Ellison et al. |
| 5,344,183 A | 9/1994 | Hersman et al. |
| 5,354,397 A | 10/1994 | Miyake et al. |
| 5,362,342 A | 11/1994 | Murray et al. |
| 5,401,449 A | 3/1995 | Hill et al. |
| 5,423,933 A | 6/1995 | Horian |
| 5,429,786 A | 7/1995 | Jorgan et al. |
| 5,443,777 A | 8/1995 | Mills |
| 5,456,957 A | 10/1995 | Jackson et al. |
| 5,458,361 A | 10/1995 | Gajewski |
| 5,466,412 A | 11/1995 | Parker et al. |
| 5,487,557 A | 1/1996 | Eckhout |
| 5,490,893 A | 2/1996 | Enlow et al. |
| 5,520,412 A | 5/1996 | Davis |
| 5,529,336 A | 6/1996 | Eckhout |
| 5,626,704 A | 5/1997 | Bowers, Jr. et al. |
| 5,725,712 A | 3/1998 | Spain et al. |
| 5,741,446 A | 4/1998 | Tahara et al. |
| 5,741,454 A | 4/1998 | Polidori |
| 5,744,210 A | 4/1998 | Hofmann et al. |
| 5,759,477 A | 6/1998 | Yamamoti |
| 5,763,024 A | 6/1998 | Yetka |
| 5,765,864 A * | 6/1998 | Winget ..................... 280/731 |
| 5,776,522 A | 7/1998 | Budnick |
| 5,779,841 A | 7/1998 | Yamanaka |
| 5,786,049 A | 7/1998 | Nusshor |
| 5,968,657 A | 10/1999 | Scollin et al. |
| 6,001,207 A | 12/1999 | Enlow et al. |
| 6,042,678 A | 3/2000 | Johnson et al. |

FOREIGN PATENT DOCUMENTS

| | | |
|---|---|---|
| JP | 62-248611 | 10/1987 |
| JP | 4-308739 | 10/1992 |

* cited by examiner

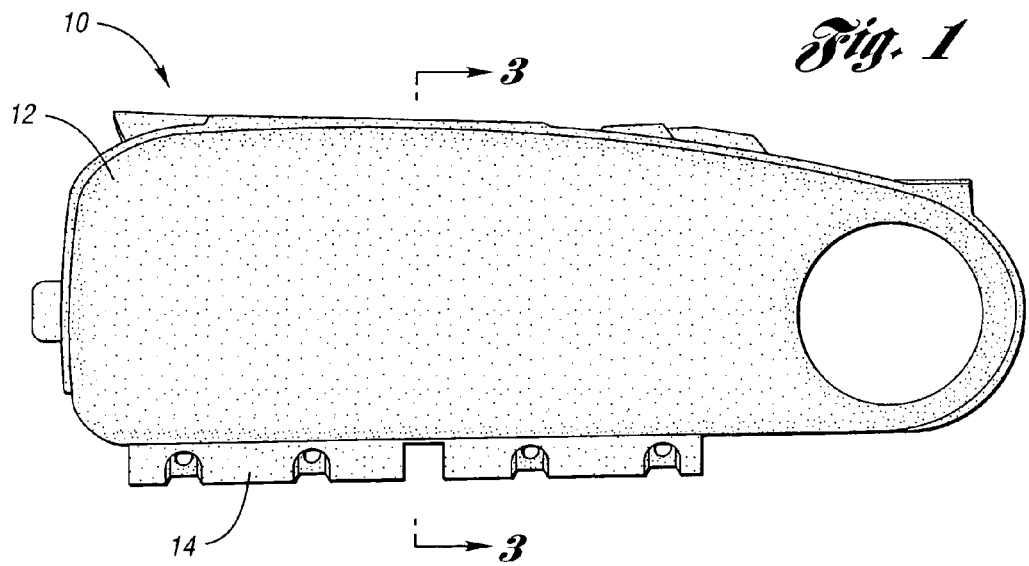
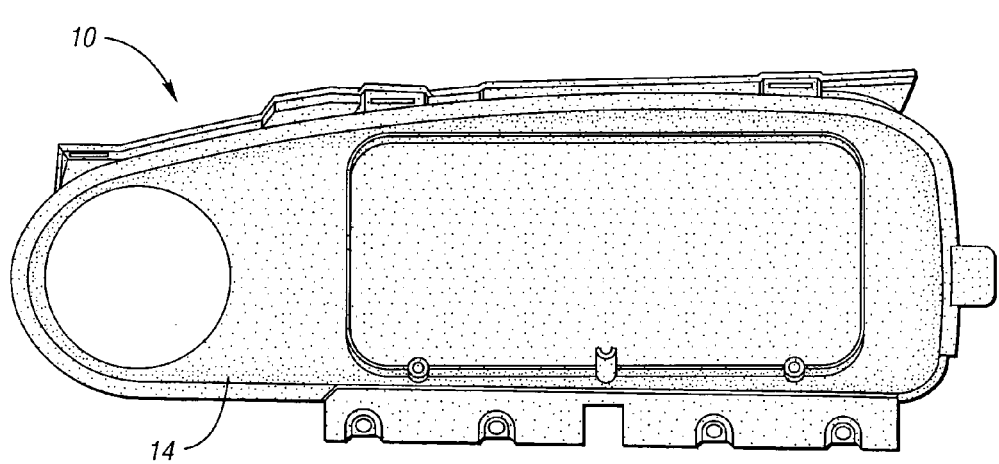
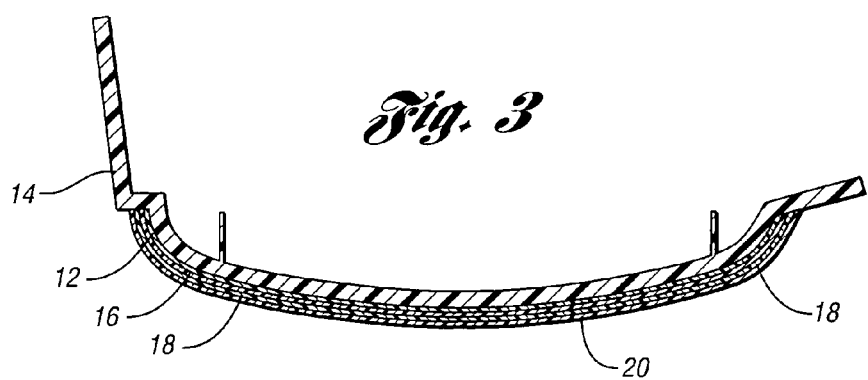

METHOD OF MANUFACTURING AN IN-MOLD LAMINATE COMPOSITION

CROSS-REFERENCE TO RELATED APPLICATIONS

This application is a continuation of U.S. patent application Ser. No. 10/193,407 entitled "Method Of Manufacturing A Painted Vehicle Part", filed Jul. 11, 2002 now abandoned as a continuation of U.S. patent application Ser. No. 09/083,943 entitled "Method Of Manufacturing A Painted Vehicle Part", now U.S. Pat. No. 6,428,738, filed May 22, 1998 as a continuation-in-part of U.S. patent application Ser. No. 08/929,025 entitled "Method Of Manufacturing A Painted Vehicle Part", now abandoned, filed on Sep. 15, 1997 as a continuation of U.S. patent application Ser. No. 08/551,517 entitled "Method Of Manufacturing A Painted Vehicle Part", filed on Nov. 1, 1995 and now abandoned.

BACKGROUND OF THE INVENTION

1. Field of the Invention

This invention relates to methods of manufacturing painted parts, and in particular to methods of manufacturing painted plastic parts adapted for use on motor vehicles such as air bag covers, side cladding, instrument panel cluster bezels, exterior bumpers, and the like.

2. Background Art

Typically, plastic parts are painted after they are molded. The painting process requires elaborate facilities and consequently necessitates large expenses. For instance, significant square footage of a factory must be dedicated to a clean room environment for the spraying of paint and clear coat and for the baking and curing of paint on components, such as those components used in the automotive industry, such as body panels, air bag covers, instrument panels and the like. Moreover, solvent-based paints have in recent years raised significant environmental concerns because of the volatile organic components which are emitted into the air during the application of such solvent-based paints. As a result, the evaporation of such solvents must be strictly monitored to satisfy environmental and safety regulations.

In addition, automotive components, especially interior automotive components, are strictly scrutinized following the painting process in order to match or conform the automotive component to the styling and aesthetic requirements of the associated interior trim product. Painting such automotive components following the molding process, raises quality concerns with respect to the color, consistency, and thickness of each individual paint application.

U.S. Pat. No. 4,902,557, the Rohrbacher reference discloses a method and apparatus for manufacturing a thermoplastic polyolefin composite useful as an exterior auto or truck body part.

U.S. Pat. No. 4,769,100, the Short reference, teaches a method of applying a carrier film pre-printed with metallic paint to an automobile body panel in a vacuum forming process.

U.S. Pat. No. 4,952,351 and U.S. Pat. No.5,466,412, the Parker patents, teach a method of manufacturing an air bag cover for an inflatable air bag system including a bondable film carrier, which is painted after the film carrier is molded.

However, the prior art fails to provide a method of manufacturing a painted component wherein the step of painting the component after molding is eliminated and further where the component has the structural integrity both in terms of durability and strength to support varying applications.

SUMMARY OF THE INVENTION

An object of the present invention is to provide a method for manufacturing a painted component while addressing paint quality issues such as: drips, runs, spits, dry spray, light coverage, gloss, color match, contamination and paint adhesion.

Another object of the present invention is to provide a method for manufacturing a painted component and reducing molding scrap due to splay, flow marks and minor surface imperfections which can be completely covered.

Yet still another object of the present invention is to provide a method of manufacturing a painted component, such as a composite air bag cover, side cladding, and the like, wherein the components have increased durability.

In carrying out the above objects and other objects of the present invention a method is provided for manufacturing a painted plastic component. The method includes the steps of providing a film sheet having top and bottom surfaces; vacuum molding the film sheet and the mold cavity to obtain a pre-form; placing the pre-form in a mold cavity of an injection mold having a shape defining the desired plastic component; and injecting a thermoplastic elastomer into the mold cavity of the injection mold to generate a structural carrier for the pre-form, the generation of the structural carrier creating sufficient pressure and heat to bond the structural carrier to the bottom surface of the pre-form to form the molded laminate component.

Further in carrying out the above objects and other objects of the present invention, a method is provided for manufacturing a molded laminate automotive component. The method includes the steps of inserting a film sheet into a vacuum forming station to form the film sheet into a predetermined automotive component shape to create a formed film sheet having top and bottom surfaces, placing the formed film sheet in a mold cavity of an injection mold having a shape defining the automotive component, and injecting a thermoplastic elastomer into the mold cavity of the injection mold, such that the thermoplastic elastomer is in mating contact with the bottom surface of the formed film sheet, to generate a structural carrier for the formed film sheet, the generation of the structural carrier creating sufficient pressure and heat to bond the structural carrier to the bottom surface of the formed film sheet to form the molded laminate automotive component.

The above objects and other objects, features and advantages of the present invention are readily apparent from the following detailed description of the best mode for carrying out the invention when taken in connection with the accompanying drawings.

BRIEF DESCRIPTION OF THE DRAWINGS

FIG. 1 is a front elevational view of one type of air bag cover adapted to be mounted on a side door.

FIG. 2 is a rear elevational view of the air bag cover depicted in FIG. 1.

FIG. 3 is a sectional view of the air bag cover of FIG. 1 taken along lines 3—3.

DETAILED DESCRIPTION OF THE PREFERRED EMBODIMENTS

Figure 4:
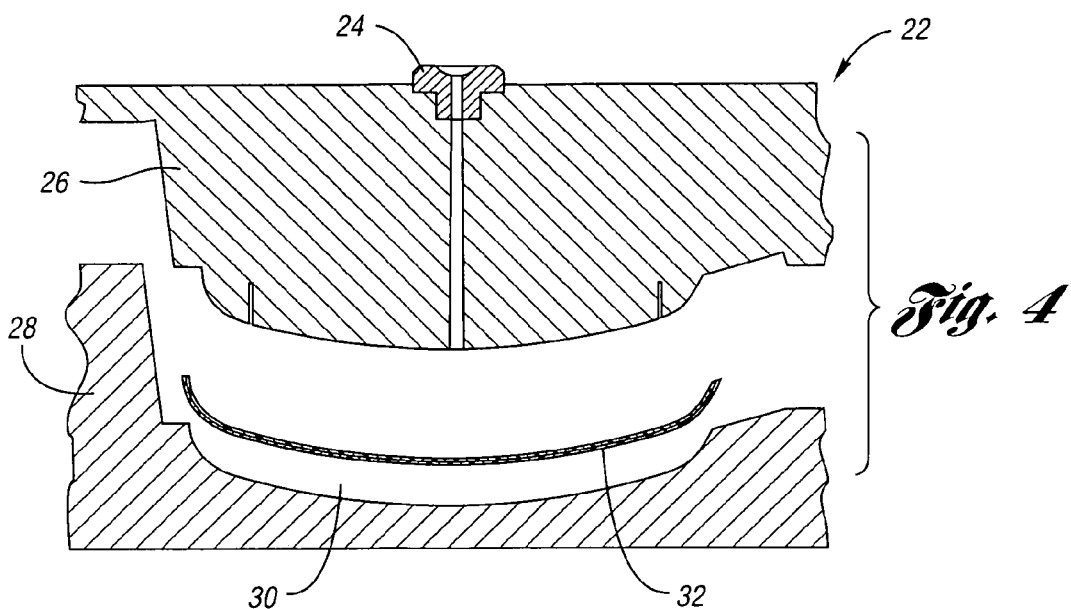
FIG. 4 is a schematic view of a conventional injection molding system which may be utilized to make the plastic components of the present invention, the system is depicted in an open position with the pre-form placed between two plates of the mold body.

While the examples and figures provided herein refer to automotive plastic components, this invention has substantial application in other areas and is thus intended to have broader scope than the cited representative examples. In essence, this invention can be used with any application calling for a painted plastic component.

Referring now to the drawing figures, there is illustrated in FIG. 1 a front elevational view of one type of air bag cover, generally indicated at 10, adapted to be mounted on an automotive side door. The air bag cover 10 includes a painted one-piece outer layer 12, composed of a film sheet, preferably a pre-painted film sheet, which is vacuum molded in a vacuum mold from a material compatible with the air bag body or structural carrier 14, which is preferably injection molded in an injection mold. The air bag body 14 is preferably composed of a thermoplastic elastomer. The elastomer of the air bag body or structural carrier 14 should be compatible with the outer layer 12 so that a bottom contact surface of the outer layer 12, mounts with the front contact surface of the air bag body 14 by diffusion between the surfaces thereof in the injection mold to prevent the air bag body 14 from separating from the outer layer 12 during use of the air bag cover 10.

The outer layer 12 is composed of a film sheet that is pre-painted. The film sheet is preferably a polyester sheet such as Mylar®, a polyurethane or polycarbonate sheet.

In the preferred embodiment, the outer layer comprises a film sheet with the following coatings placed thereon, a layer of acrylic color in mating contact with the film sheet and a layer of polyvinylidine fluoride (PVDF) with an acrylic clear coat to protect the film from damage and to provide film elasticity, chemical resistance, stain resistance, weathering and UV protection. In the most preferred embodiment, PVDF comprises 72% of the total film thickness which is about 0.2 millimeter.

The thermoplastic elastomer of the air bag body or structural carrier 14 is preferably a thermoplastic elastomer such as a thermoplastic polyolefin, thermoplastic urethane, polyester, polycarbonate, a mixture of polycarbonate and ABS (acrylonitrile/butadiene/styrene) or similar material.

For other automotive applications, the carrier 14 is varied to accommodate the intended use. Accordingly, for bumper/fascia applications, the structural carrier 14 can be selected from at least the following materials: lomod®, bexloy® and thermoplastic polyolefin. For cluster bezel applications, the structural carrier 14 can be selected from at least the following materials: ABS (acrylonitrile/butadiene/styrene), a mixture of polycarbonate and ABS, polycarbonate, and polypropylene.

The durometer and elastic or flex modulus of the materials also vary depending on the desired stiffness of the component. Typically, the durometer of the air bag body 14 will be in the range of about 20 Shore D to 100 Shore D, while the flexural modulus will be in the range of about 15,000 to about 400,000 psi. Also, typically, the durometer of the outer layer 12 will be in the range of about 15 Shore A to 100 Shore A. These ranges of course vary depending on the desired plastic component to be manufactured and are only illustrative of one example.

As depicted in FIG. 3, a sectional view of the air bag cover of FIG. 1 taken along lines 3—3, in a manufactured component, the air bag body or structural carrier 14 supports the outer layer 12 which has a pre-painted coating 16 placed thereon, followed by a base coat 18, preferably a layer of acrylic color, and a clear coat 20, preferably an acrylic clear coat and a layer of PVDF.

Referring now to FIG. 4, there is illustrated a conventional injection mold, generally indicated at 22, for making a plastic component pursuant to the present invention.

Briefly, with an injection molding system there is included an injection molding machine, having a nozzle, generally indicated at 24, for injecting predetermined amounts or shots of molten resin. The injection molding machine includes a hydraulic screw ram which is disposed in a bore formed in a barrel of the injection molding machine. The ram plasticizes and advances resin towards the nozzle 24. Upon complete plasticization of the resin, the screw ram is hydraulically advanced towards threaded portions of the barrel to inject molten plastic through the nozzle 24, as is well known in the art.

As depicted in FIG. 4, opposing surfaces of male and female mold parts 26 and 28 respectively define a mold cavity 30.

Figure 5:
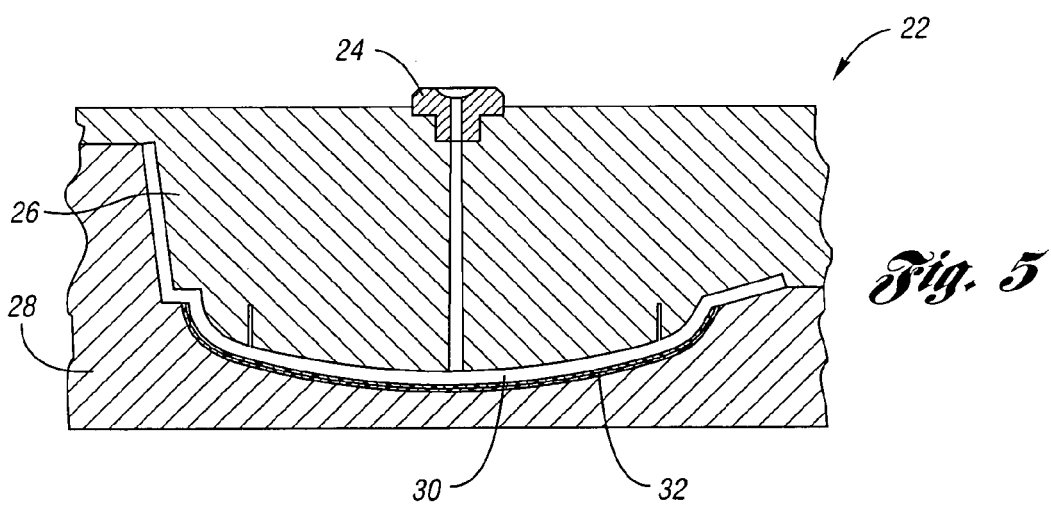
FIG. 5 is a schematic view of a conventional injection molding system depicted in a closed position, with the pre-form placed between the two plates of mold body.
Figure 6:
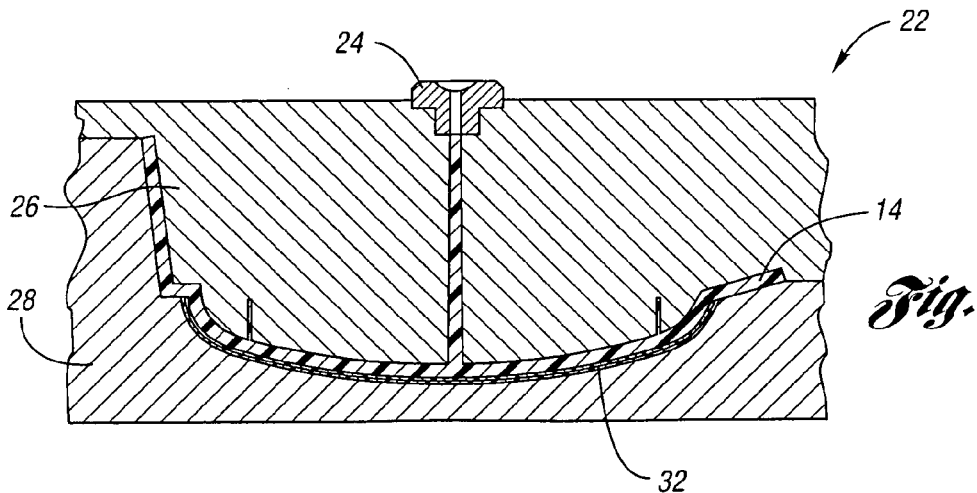
FIG. 6 is a schematic view of a conventional injection molding system depicting the mold cavity with the molten resin injected therein to form the structural carrier for the pre-form.

As illustrated in FIG. 5, there is a depiction of a one-piece pre-form 32 created from the vacuum molded film sheet which is first placed in the mold cavity 30. Thereafter, as depicted in FIG. 6, the air bag body or structural carrier 14 is molded in the plastic injection molding system to form a completed unitary laminate plastic component.

The body of the air bag cover 14 may also be formed from thermoplastic polyolefin, polycarbonate, tee tpe, sebs tpe, and a mixture of polycarbonate and acrylonitrile/butadiene/styrene (ABS). The corresponding film sheet 12 must be compatible with the plastic of the body so that diffusion between contact surfaces occurs. Additionally, the laminate should be compatible with the substrate on which the laminate is to be adhered. In general, this requirement is achieved by selecting a structural carrier 14 with at least one or more materials common to the substrate on which the laminate is to be adhered. As an example, with a thermoplastic polyolefin substrate, the structural carrier should include polypropylene.

In an alternative embodiment, the mold can be modified to produce a plastic component with embossed lettering. This embossed effect is achieved by etching into the mold the desired pattern or letters so that the letters have at least a 0.5 millimeter radius on the edge of the letter, or else the film will tear and stretch.

The unique features of the laminate plastic components are 1) a stiff inner material to support the intended application; 2) reduction and/or elimination of paint problems such as drips, runs, spits, dry spray, light coverage and gloss and improved color match and paint adhesion; 3) reduced molding scrap due to splay, flow marks and minor surface imperfections, which can be completely covered; and 4) increased durability of the resulting plastic laminate components.

It should be understood that the film sheet can be positioned in the injection mold either by way of a pre-form, as described above, or by way of a film roll supply. In this way, one can mold in the color at the press or mold thereby avoiding a secondary painting operation.

While the best mode for carrying out the invention has been described in detail, those familiar with the art to which this invention relates will recognize various alternative designs and embodiments for practicing the invention as defined by the following claims.

What is claimed is:

1. A method of manufacturing a molded plastic component, comprising:
    providing a polyester film sheet having top and bottom surfaces, the film sheet having a pre-painted coating covered by a base coat of an acrylic color which is covered by an acrylic clear coat and a layer of polyvinylidine fluoride;
    vacuum molding the film sheet in a mold cavity;
    creating a pre-form from the vacuum molded film sheet;
    placing the pre-form in a mold cavity of an injection mold having a shape defining the desired plastic component; and
    injecting a thermoplastic elastomer, which is selected from the group consisting of a thermoplastic polyolefin, thermoplastic urethane, polyester, polycarbonate, acrylonitrile/butadiene/styrene, polypropylene, a mixture of acrylonitrile/butadiene/styrene and polycarbonate, and mixtures thereof, into the mold cavity of the injection mold to generate a structural carrier for the pre-form, the generation of the structural carrier creating sufficient pressure and heat to bond the structural carrier to the bottom surface of the pre-form to form the molded laminate plastic component, the injection of the thermoplastic elastomer into the mold cavity being at a pressure of 50 psi to 15,000 psi, and the resultant structural carrier having a flexural modulus in the range of 15,000 to 400,000 psi and also having a durometer in the range of 15 to 100 Shore D.

* * * * *